United States Patent
Shtekler et al.

(10) Patent No.: US 9,475,933 B2
(45) Date of Patent: Oct. 25, 2016

(54) ANTIMONY TRIOXIDE FREE FLAME RETARDANT THERMOPLASTIC COMPOSITION

(75) Inventors: Rachel Shtekler, Moshav Shafir (IL); Yoav Bar Yaakov, Tel Aviv (IL); Pierre Georlette, Omer (IL); Sergei V. Levchik, Croton-on-Hudson, NY (US)

(73) Assignee: ICL-IP America Inc., Tarrytown, NY (US)

( * ) Notice: Subject to any disclaimer, the term of this patent is extended or adjusted under 35 U.S.C. 154(b) by 264 days.

(21) Appl. No.: 13/992,928

(22) PCT Filed: Dec. 20, 2011

(86) PCT No.: PCT/US2011/066103
§ 371 (c)(1),
(2), (4) Date: Sep. 12, 2013

(87) PCT Pub. No.: WO2012/088080
PCT Pub. Date: Jun. 28, 2012

(65) Prior Publication Data
US 2014/0005303 A1    Jan. 2, 2014

Related U.S. Application Data

(60) Provisional application No. 61/425,877, filed on Dec. 22, 2010.

(51) Int. Cl.
| | |
|---|---|
| *C08L 67/02* | (2006.01) |
| *C08K 5/00* | (2006.01) |
| *C08K 5/02* | (2006.01) |
| *C08K 5/5333* | (2006.01) |
| *C08L 77/06* | (2006.01) |

(52) U.S. Cl.
CPC .............. *C08L 67/02* (2013.01); *C08K 5/0066* (2013.01); *C08K 5/0091* (2013.01); *C08K 5/02* (2013.01); *C08K 5/5333* (2013.01); *C08L 77/06* (2013.01)

(58) Field of Classification Search
CPC ............................. C08L 63/00; C08L 67/02
USPC ......................................................... 523/451
See application file for complete search history.

(56) References Cited

U.S. PATENT DOCUMENTS

| | | | |
|---|---|---|---|
| 6,365,071 B1 | 4/2002 | Jenewein et al. | |
| 6,521,703 B2 * | 2/2003 | Zarnoch et al. | 525/17 |
| 9,018,312 B2 | 4/2015 | Son et al. | |
| 2003/0130381 A1 * | 7/2003 | Joachimi et al. | 524/88 |
| 2005/0075426 A1 * | 4/2005 | Campbell et al. | 524/115 |
| 2005/0075472 A1 * | 4/2005 | Yeager et al. | 528/86 |
| 2008/0023887 A1 * | 1/2008 | Vollenberg et al. | 264/500 |
| 2015/0126650 A1 * | 5/2015 | Georlette et al. | 524/101 |

FOREIGN PATENT DOCUMENTS

| | | |
|---|---|---|
| CN | 101128541 A | 2/2008 |
| JP | 2007070615 A | 3/2007 |
| WO | 2007/007663 A1 | 1/2007 |
| WO | 2009/080554 A1 | 7/2009 |

OTHER PUBLICATIONS

International Preliminary Report on Patentability.
International Search Report and Written Opinion mailed Mar. 27, 2012.
Office Action dated Jun. 30, 2014 in corresponding Japanese Patent Application No. 2013-546318.

* cited by examiner

*Primary Examiner* — Megan McCulley
(74) *Attorney, Agent, or Firm* — Dilworth & Barrese LLP

(57) ABSTRACT

There is provided herein a flame retardant thermoplastic composition comprising: a. at least one thermoplastic polyester or polyamide; b. at least one brominated flame retardant; c. at least one metal phosphonate or phosphinate. There is also provided a method of making said flame retardant thermoplastic composition; and an article containing the thermoplastic polymer composition.

15 Claims, No Drawings

ANTIMONY TRIOXIDE FREE FLAME RETARDANT THERMOPLASTIC COMPOSITION

FIELD OF THE INVENTION

The present invention relates to flame-retarded thermoplastic compositions and more particularly to flame-retarded thermoplastic polyester or polyamide compositions and articles containing the same.

BACKGROUND OF THE INVENTION

Glass reinforced or non-reinforced thermoplastic polyesters and polyamides are used for the production of electronic parts such as connectors, frames, moving parts, transformers, micro motors, amongst others. In most of these applications, flame retardancy is needed and is usually provided by flame retardant systems based on a combination of brominated flame retardants with antimony trioxide as synergist. But this type of flame retardant system has a limitation, because antimony trioxide, being a very efficient synergist, tends to significantly increase the smoke yield, which impairs visibility and creates problems for evacuation of people in the case of fire. Furthermore, antimony trioxide has a very high bulk density which increases the specific gravity of molded parts. This is especially undesirable in transportation and aviation. Even furthermore, antimony trioxide has significantly increased in price in recent years. Even furthermore some recently introduced ecolabels require elimination of antimony trioxide from thermoplastic parts.

Although there is a clear need for low antimony trioxide or antimony trioxide free flame retardant plastics, such usually requires a significant increase in the loading of brominated flame retardant.

SUMMARY OF THE INVENTION

It has been unexpectedly discovered herein that a combination of brominated flame retardant and a high phosphorus-content phosphorus flame retardant provides a flame retardant additive for thermoplastic polymers, more specifically thermoplastic polyesters and polyamides, preferably glass-reinforced polybutylene terephthalate or polyethylene terephthalate or nylon 6 or nylon 6.6, providing flame retardant efficiency adequate to thermoplastic resins in electrical and electronic applications without requiring the use of antimony trioxide.

The present invention is directed to antimony trioxide free flame retardant composition comprising:
 (a) at least one thermoplastic polyester or polyamide
 (b) at least one brominated flame retardant;
 (c) at least one high phosphorus content flame retardant, more specifically a metal phosphonate or metal phosphinate.

Further the antimony trioxide free flame retardant composition can optionally comprise inorganic fillers, impact modifiers, heat stabilizers, antioxidants, processing aids, and other additives enhancing physical properties of the resin.

Further, the present invention is also directed to a molded part comprising a thermoplastic polymer, glass fiber, and a brominated flame retardant, aluminum methyl methylphosphonate or aluminum diethylphosphinate and optionally fillers, antioxidants, processing aids, and colorants.

Still further, the present invention is directed to a method of making a flame retarded article comprising blending a thermoplastic polymer, a brominated flame retardant, aluminum methyl methylphosphonate or aluminum diethylphosphinate and optionally, a solid filler.

DETAILED DESCRIPTION OF THE INVENTION

A thermoplastic polyester component used in one embodiment of this invention can be any thermoplastic polyester manufactured by polycondensation polymerization of a glycol component and an acid component.

The glycol component can contain one or more of the following glycols such as ethylene glycol, trimethylene glycol, 2-methyl-1,3-propane glycol, 1,4-butylene glycol, hexamethylene glycol, decamethylene glycol, cyclohexane dimethanol, or neopentylene glycol.

The acid component can contain one or more of the following acids such as terephthalic acid, isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxy benzoic acid, sebacic acid, adipic acid and polyester-forming derivatives thereof.

Blends of polyesters may also be employed as the thermoplastic polyester in the composition. As indicated earlier, preferred polyesters are poly(ethylene terephthalate), poly (1,3-trimethylene terephthalate) and poly(1,4-butylene terephthalate). When blends of these preferred components are employed the thermoplastic polyester component can comprise from about 1 to about 99 parts by weight of one polyester and from about 99 to about 1 part by weight of a different polyester based on 100 parts by weight of both components combined.

The preferred thermoplastic polyester (a), poly(1,4-butylene terephthalate) resin used in the present invention is one obtained by polymerizing a glycol component which is at least 70 mol %, preferably at least 80 mol %, comprised of 1,4-butylene glycol, with an acid component which is at least 70 mol %, preferably at least 80 mol %, comprised of terephthalic acid, and polyester-forming derivatives.

In another embodiment of this invention antimony trioxide free flame retardant thermoplastic composition can comprise one or a few polyamides.

Suitable polyamide components include polyamide-6, polyamide-6,6, polyamide-11, polyamide-12, polyamide-4, 6, polyamide-6,10 and polyamide-6,12, as well as polyamides prepared from terephthalic acid and/or isophthalic acid and trimethylhexamethylenediamine; polyamides prepared from adipic acid and m-xylylenediamines; polyamides prepared from adipic acid, azelaic acid, and 2,2-bis-(p-aminocyclohexyl)propane, and polyamides prepared from terephthalic acid and 4,4'-diaminodicyclohexylmethane. Mixtures and/or copolymers of two or more of the foregoing polyamides or prepolymers thereof, respectively, are also within the scope of the present invention.

Furthermore, the polyamides may be made by any known method, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

The preferred polyamides for this invention are polyamide-6; polyamide 6,6; polyamide 11 and polyamide 12, with the most preferred being polyamide-6,6.

Blends of various polyamide resins as the polyamide component (a) can comprise from about 1 to 99 parts by weight preferred polyamides as set forth above and from 99 to 1 part by weight other polyamides based on 100 parts by weight of both components combined.

The present invention is directed to flame retardant additive compositions that contain a unique and unexpected combination of bromine compounds and high-phosphorus content compound. Such flame retardant additive compositions can be used in thermoplastic polymers, which are reinforced or unreinforced to provide flame retardancy while being antimony trioxide free.

Brominated flame retardants of the invention (b) include flame retardant compounds of the following formulas:

Decabromodiphenyl oxide sold under the trade name FR-1210

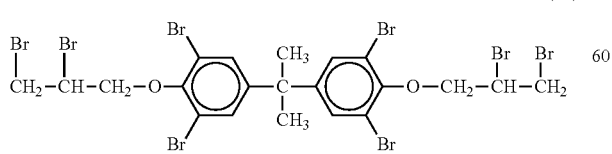
(I)

Tetarbromobisphenol A sold under the trade name FR-1524

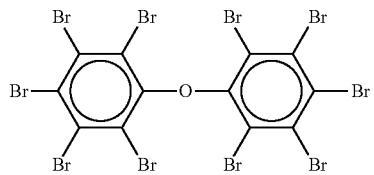
(II)

Tetrabromobisphenol A bis(2,3-dibromopropyl) ether) sold under the trade name FR-720

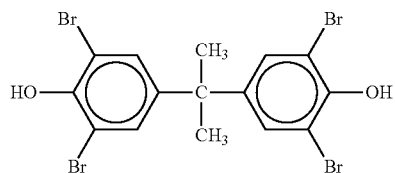
(III)

Tris(tribromophenoxy)triazine sold under the trade name FR-245

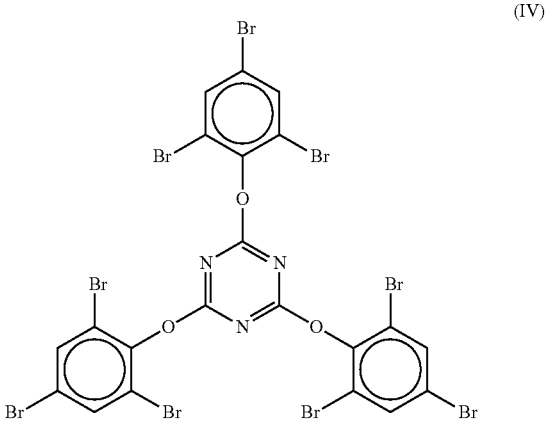
(IV)

Tris(tribromoneopenyl)phosphate sold under the trade name FR-370

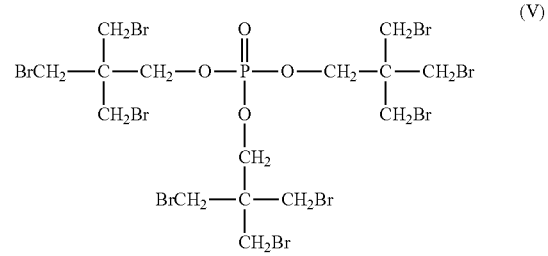
(V)

Brominated polyacrylate sold under the trade name FR-1025

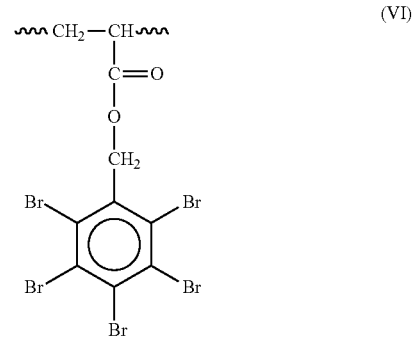
(VI)

Brominated polystyrene sold under the trade name FR-803P

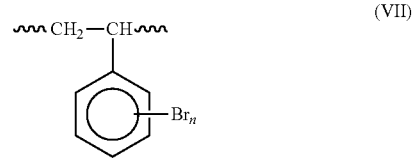
(VII)

Brominated epoxy polymers sold under the trade name F-2000 series

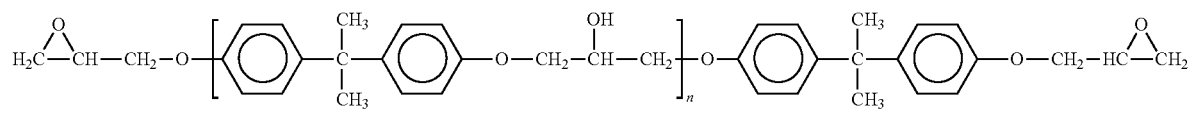
End capped brominated epoxy polymers sold under the trade name F-3000 series
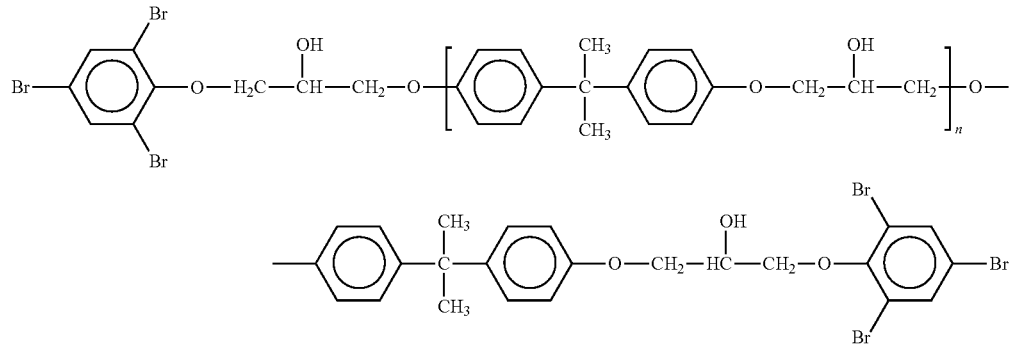
Phenoxy-terminated carbonate oligomer of tetrabromobisphenol A
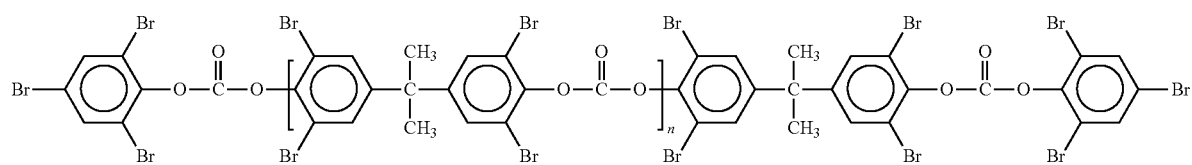
Decabromodiphenylethane
Ethylenebistetrabromophthalimide
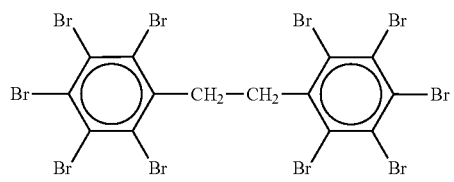
Tetradecabromodiphenoxybenzene
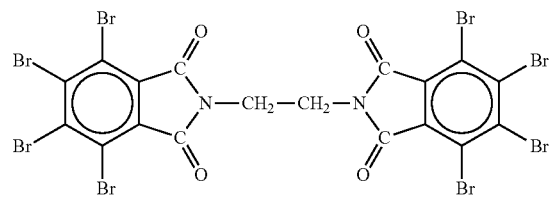
Tetrabromobisphenol S bis(2,3-dibromopropyl ether)
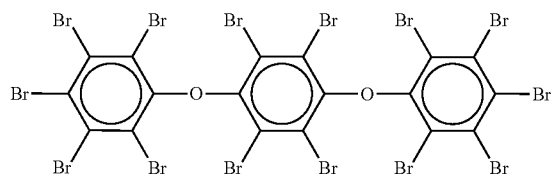
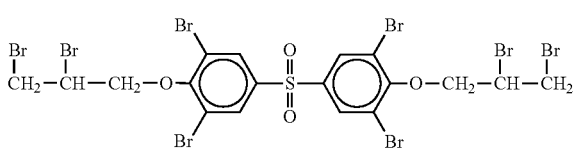

Poly-dibromophenylene oxide

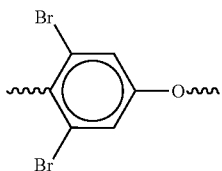

2-ethylhexyl tetrabromophthalate ester

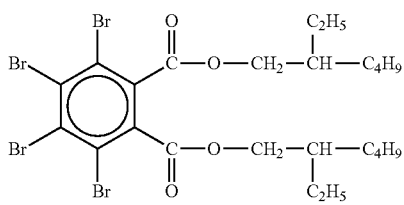

Bis(tribromophenoxy)ethane

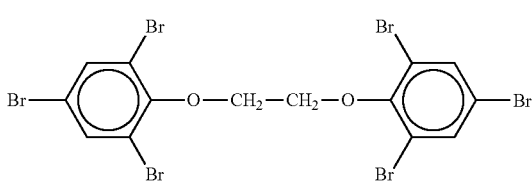

The metal phosphonate or metal phosphinate (c) used herein can be any metal phosphonate or phosphinate represented by the formula:

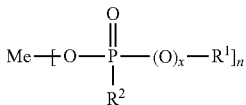

where Me is metal, $R^1$ and $R^2$ are the same or different linear or branched or cyclic alkyls having up to 6 carbon atoms, or benzyl, n is a metal valency and can be, 1, 2, 3 or 4, x is 1 for metal phosphonates and x is 0 for metal phosphinates.

Metals (Me) which can be present in a metal phosphonate or phosphinate include alkaline earth or transitionary metals such as the non-limiting group consisting of Ca, Zn, Al, Fe, Ti and combinations thereof. The most preferable metal is Al.

The short alkyl radicals $R^1$ and $R^2$ are more preferable for this invention because they contain a larger weight percent of phosphorus. Methyl and ethyl radicals are the most preferable.

The most preferable metal phosphonate is aluminum methyl methylphosphonate (AMMP).

The most preferable metal phosphinate is aluminum diethylphosphinate (DEPAL).

An inorganic filler of the present invention may be added to the antimony trioxide free flame retardant thermoplastic composition for the purpose of reducing the molding shrinkage coefficient and linear expansion coefficient of a resultant molded article and improving high and low heat shock property, and various fillers in the form of fiber or non-fiber (e.g., powder, plate) may be used depending on the desired article. Some examples of fibrous filler, which are types of inorganic filler, may be those such as, glass fiber, glass fiber having a non-circular cross section such as flat fiber, carbon fiber, silica fiber, silica.alumina fiber, zirconia fiber, boron nitride fiber, silicon nitride fiber, boron fiber, potassium titanate fiber, and further, metal fibrous substances such as stainless, aluminum, titanium, copper and brass. Particularly, the typical fibrous filler is glass fiber or carbon fiber. On the other hand, the inorganic filler may be a powdery filler, such as carbon black, silica, quartz powder, glass bead, glass powder, calcium silicate, kaolin, talk, clay, diatomaceous earth, silicates such as wollastonite, metal oxides such as iron oxide, titanium oxide, zinc oxide and alumina, metal carbonates such as calcium carbonate and magnesium carbonate, metal sulfates such as calcium sulfate and barium sulfate, and in addition, silicon carbide, silicon nitride, boron nitride and various metal powders. Another example of inorganic filler may be plate-like filler such as, mica, glass flake and various metal foils. These inorganic fillers can be used alone or in combination of two or more. When these inorganic fillers are used, they are desirably treated previously with a sizing agent or surface treatment agent, if necessary.

The amount of the inorganic filler in the antimony trioxide free flame retardant composition may be from 1 to 50% by weight, preferably from 10 to 45% by weight and most preferably from 20 to 40% by weight. When the amount is too low, the effect for improving heat shock resistance is low, and when too high, molding work becomes difficult.

The antimony trioxide free flame retardant composition may also further comprise impact modifiers such as elastomers and core-shell polymers. These elastomers can be thermoplastic elastomers, which can be melt-mixed with thermoplastic polyester resin (a) because they are solids having rubber-like elasticity at normal temperature, but heating them decreases the viscosity thereof. The specific thermoplastic elastomer used is not particularly restricted, and olefin-, styrene-, polyester-, polyamide- and urethane-based elastomers may be used as non-limiting examples.

A core shell polymer is a core shell type graft copolymer having a multi-layer structure and preferably in which a rubber layer having an average particle size of 1.0 μm or less is wrapped with a vitreous resin. The rubber layer of the core shell type copolymer has an average particle size of 1.0 μm or less, and preferably from 0.2 to 0.6 μm. If the average particle size of the rubber layer is over 1.0 μm, the effect for improving impact resistance property may be insufficient. As the rubber layer of this core shell type copolymer, those obtained by copolymerization/graft copolymerization of at least one of a silicon-based, diene-based or acrylic elastomer can be used.

Other ingredients typically employed in amounts less than 10 percent by weight of the antimony trioxide free flame retardant thermoplastic composition, preferably less than 5 percent by weight, include non-limiting examples such as anti-dripping agents, lubricants, heat stabilizers, and other additives used to enhance the properties of the resin. Typically, transesterification inhibitors are used in amounts from 0.01 percent to 0.5 percent by weight and include monozinc phosphate, zinc phosphate, or other types of inhibitors. Conventional stabilizer additives may be preferably utilized in amounts from 0.01 to 5 percent by weight of the total antimony trioxide free flame retardant thermoplastic composition and include examples such as hindered phenols and antioxidants.

In one embodiment herein the antimony trioxide free flame retardant thermoplastic composition comprises thermoplastic polyester or polyamide (a) in an amount of from about 40 to about 90 weight percent; brominated flame retardant (b) in an amount of from about 5 to about 30 weight percent; and, the metal phosphonate or phosphinate (c) in an amount of from about 1 to about 10 weight percent all based on the total weight of the antimony trioxide free flame retardant thermoplastic composition.

In a more specific embodiment, the antimony trioxide free flame retardant thermoplastic composition comprises thermoplastic polyester or polyamide (a) in an amount of from about 40 to about 90 weight percent; brominated flame retardant (b) in an amount of from about 5 to about 30 weight percent; the metal phosphonate or phosphinate (c) in an amount of from about 1 to about 10 weight percent; and, inorganic filler in an amount of from about 10 to about 35 weight percent said weight percents being based on the total weight of the antimony trioxide free flame retardant composition.

These amounts of flame retardant additives (a), (b), (c) and inorganic filler in the antimony trioxide free flame retardant thermoplastic composition are flame retardant effective amounts thereof.

The antimony trioxide free flame retardant thermoplastic composition herein can have a flame retardancy classification of one or more of HB, V-2, V-1, V-0 and 5VA according to UL-94 protocol. In one embodiment the antimony trioxide free flame retardant thermoplastic composition can have a flame retardancy of at least V-1 or V-0.

The method of blending the compositions of this invention is not critical and can be carried out by conventional techniques. One convenient method comprises blending the polyester (a) and other ingredients in powder or granular form, extruding the blend and comminuting the blend into pellets or other suitable shapes.

Although it is not essential, best results are obtained if the ingredients are precompounded, pelletized and then molded. Precompounding can be carried out in conventional equipment. For example, after carefully predrying the polyester resin (a), other ingredients, and, optionally, other additives and/or reinforcements, a single screw extruder is fed with a dry blend of the composition, the screw employed having a long transition section to insure proper melting. On the other hand, a twin screw extrusion machine e.g., a ZE25 with L/D=32 ex Berstorff extruder can be fed with resins and additives at the feed port and have reinforcement down stream. In either case, a generally suitable machine temperature will be about 220° to 320° C.

The precompounded composition can be extruded and cut or chopped into molding compounds, such as conventional granules, pellets, etc. by standard techniques.

The antimony trioxide free flame retardant thermoplastic composition can be molded in any equipment conventionally used for thermoplastic compositions. For example, good results will be obtained in an injection molding machine, e.g. of the Arburg 320S Allrounder 500-150 type, at conventional temperatures, e.g., 230 to 270 degrees Centigrade. If necessary, depending on the molding properties of the polyester (a), the amount of additives and/or reinforcing filler and the rate of crystallization of the polyester component (a), those skilled in the art will be able to make the conventional adjustments in molding cycles to accommodate the composition.

In another embodiment herein there is provided a molded article comprising the antimony trioxide free flame retardant thermoplastic composition, preferably where the molded article is made by injection molding.

The antimony trioxide free flame retardant thermoplastic composition of the present invention is useful, for example, in the production of electronic components, such as for example, connectors, frames, moving parts, transformers and micromotors, and the like.

In a specific embodiment herein there are provided injection molded components, e.g., electronic components, comprising a thermoplastic polymer (a), glass fiber, and a flame retardant additive composition, which composition comprises brominated polyacrylate (b) and aluminum methyl methylphosphonate (c).

In another embodiment there is provided a flame retarded article, e.g., an electronic component, preferably an injection molded electronic component, as described herein, made by the above-described method.

The following examples are used to illustrate the present invention.

EXAMPLES

In order to prepare samples of flame retarded glass reinforced polybutylene terephthalate (PBT) or nylon 6.6 that illustrate the invention, the following procedures have been used.

1. Materials.

The materials used in this study are presented in Table 1.

2. Compounding

The polymers pellets, AMMP or DEPAL and lubricants and stabilizers were weighted on semi analytical scales with consequent manual mixing in plastic bags. The mixtures were introduced into the main feeding port of the extruder via feeder No 1. FR-1025, FR-803P, F-2400 and F-3100 were introduced into the main feeding port of the extruder via feeder No 2.

The glass fibers were fed by feeder No 3 to the 5-th section of the extruder via lateral feeder. Compounding was performed in a twin screw co-rotating L/D=32 ex Berstorff ZE25.

The obtained pellets were dried in a circulating air oven ex Heraeus instruments at 120° C. for 4 hours.

3. Injection Molding.

Test specimens were prepared by injection molding in Allrounder 500-150 ex. Arburg.

4. Conditioning

Specimens were conditioned at 23° C. for 168 hours before testing.

5. Test Methods.

Tests used in this work are summarized in Table 2.

6. Results

Composition and tests results for PBT resin are presented in Table 3.

As it is shown in comparative example 1 PBT without flame retardant shows the lowest UL-94 rating, HB. Addition of brominated flame retardants as shown in comparative examples 2, 5 and 7 at relatively high bromine content of 20% allows only achieving the second lowest UL-94 rating of V-2. On the other hand addition of metal phosphonate, AMMP at the concentration corresponding to 1% phosphorus allows a significantly decreased amount of brominated flame retardant to the level of 10-13% and achieves the highest UL-94 rating of V-0 (examples 4, 7 and 9). Furthermore, decreasing of phosphorus content to 0.75% requires only marginal increase of Br content by 1% in order to maintain V-0 rating (example 3). Addition of metal phosphinate, DEPAL at the concentration corresponding to 1% phosphorus allows achieving only aV-2 UL-94 rating (example 2), but at significantly lower bromine content (comparative example 2).

Compositions and test results for nylon 6.6 are presented in Table 4.

As it is shown in comparative examples 10 and 12, the total loading of flame retardant is higher compared to inventive examples 11 and 13 respectively. Furthermore, inventive examples 11 and 13 show higher CTI and higher GWIT. In total, replacement of antimony trioxide with AMMP is beneficial for glass-filled nylon 6.6 thermoplastic.

TABLE 1

Materials

| TRADE NAME (PRODUCER) | GENERAL INFO | FUNCTION |
|---|---|---|
| PBT Celanex 2500 ex Ticona | Poly(butylene terephtalate) | plastic matrix |
| Nylon 6.6 Akulon S223-d ex DSM | Polyamide 6.6 | Plastic matrix |
| GFChopVantage 3660 ex PPG | Glass fibers | Reinforcing agents |
| FR-1025 ex ICL-IP | Brominated polyacrylate | Br-Flame retardant |
| FR-803P ex ICL-IP | Brominated polystyrene | Br-Flame retardant |
| F-3 100 ex ICL-IP | End-capped brominated epoxy polymer | Br-Flame retardant |

TABLE 1-continued

Materials

| TRADE NAME (PRODUCER) | GENERAL INFO | FUNCTION |
|---|---|---|
| Ca-stearate | Ca-stearate | Lubricant |
| Acrawax C ex Lonza | Wax | Lubricant |
| Irganox 1010 ex BASF | Multifunctional hindered phenol | Heat stabilizer/ antioxidant |
| Irganox 1171 ex BASF | Multifunctional hindered phenol | Heat stabilizer/ antioxidant |

TABLE 2

Test methods

| PROPERTY | METHOD | APPARATUS |
|---|---|---|
| Flammability vertical burning test at 0.8 mm | UL-94 | Flammability hood as recommended by UL. |
| Izod notched impact energy | ASTM D-256-81 Method C | Pendulum impact tester Type 5102 ex. Zwick |
| HDT (Deflection temperature under flexural load of the test specimen) | ASTM D648. Load 1820 kPa; heating speed 120° C./h. | HDT/VICAT- plus Davenport, Lloyd instruments |
| Tensile properties | ASTM D638-95 v = 5 mm/min | Zwick 1435 material testing machine |
| MFR—melt flow rate (250° C./2.16 kg) | ASTM D 1238-82 | Meltflixer 2000 ex. Thermo Hake |
| GWIT/GWFI (glow wire ignition/flaming test) | IEC 89/833/CD | PTL Dr. Grabenhost apparatus, Type T 03.24 |
| CTI (comparative tracking index) | IEC 60112 | Trackvis 6266.000 ex. Ceast |

TABLE 3

Flammability performance and physical properties of flame retardant PBT

| Example | Units | 1 Comp. | 2 Comp. | 3 | 4 | 5 | 6 Comp. | 7 | 8 Comp | 9 |
|---|---|---|---|---|---|---|---|---|---|---|
| Brominated FR (BFR) | | | FR-1025 | FR-1025 | FR-1025 | FR-1025 | F-3100 | F-3100 | FR-803 | FR-803 |
| PBT | % | 69.6 | 41.6 | 51.2 | 51.7 | 49.8 | 32.1 | 45.2 | 39.5 | 46.4 |
| Glass fiber | % | 30 | 30 | 30 | 30 | 30 | 30 | 30 | 30 | 30 |
| BFR | % | | 28.2 | 15.7 | 14.3 | 15.7 | 37.7 | 20.8 | 30.3 | 19.5 |
| AMMP | % | | | 2.9 | 3.8 | | | 3.8 | | 3.8 |
| DEPAL | % | | | | | 4.3 | | | | |
| Irganox 1010 | % | 0.2 | 0.2 | 0.2 | 0.2 | 0.2 | 0.2 | 0.2 | 0.2 | 0.2 |
| Br content | % | 0 | 20 | 11 | 10 | 11 | 20 | 11 | 20 | 13 |
| P content | % | 0 | | 0.75 | 1.0 | 1.0 | | 1.0 | | 1.0 |
| UL-94, 0.8 mm | rating | HB | V-2 | V-0 | V-0 | V-2 | V-2 | V-0 | V-2 | V-0 |
| Tensile strength | N/mm² | 114 | | 117.9 | 113.7 | 121 | | 117.6 | | 103.6 |
| Elongation at break | % | 3.2 | | 1.9 | 2 | 3.2 | | 1.93 | | 1.86 |
| Modulus | N/mm² | 9315 | | 11206 | 10441 | 10398 | | 11024 | | 11415 |
| Izod Notched | J/m | 97 | | 54 | 56 | 72 | | 56 | | 54 |
| MFR (250° C./2.16 kg) | g/10 min | 19 | | 27 | | | | 20 | | |
| HDT | ° C. | 209 | | 205 | 205 | 204 | | 205 | | 205 |

TABLE 1-continued

Materials

| TRADE NAME (PRODUCER) | GENERAL INFO | FUNCTION |
|---|---|---|
| F-2400 ex ICL-IP | Brominated epoxy polymer | Br-flame retardant |
| AMMP ex ICL-IP | Aluminum methyl methylphosphonate | P-Flame retardant |
| DEPAL ex Clariant | Aluminum diethylphosphinate | P-Flame retardant |
| ATO M0112 ex Kafrit | Antimony trioxide 80% masterbach | Flame retardant |

TABLE 4

Flammability performance and physical properties of flame retardant Nylon 6.6

| Example | Units | 10 Comp. | 11 | 12 Comp. | 13 |
|---|---|---|---|---|---|
| Brominated FR | | F-2400 | F-2400 | F-3100 | F-3100 |
| Nylon 6.6 | % | 44.9 | 46.7 | 42.6 | 45.0 |
| Glass fiber | % | 30 | 30 | 30 | 30 |
| BFR | % | 17.3 | 18.9 | 21.2 | 20.75 |
| ATO | | 7.9 | | 5.3 | |
| AMMP | % | | 3.8 | | 3.85 |
| Total FR | | 23.6 | 22.7 | 25.4 | 24.6 |

TABLE 4-continued

Flammability performance and physical properties of flame retardant Nylon 6.6

| Example | Units | 10 Comp. | 11 | 12 Comp. | 13 |
|---|---|---|---|---|---|
| Wax | % | 0.1 | 0.2 | 0.1 | 0.2 |
| Ca-stearate | % | 0.1 | 0.2 | 0.1 | 0.2 |
| Irganox B1171 | % | 0.5 | 0.2 | 0.5 | 0.2 |
| Br | % | 10 | 10 | 11 | 11 |
| P | % |  | 1 |  | 1 |
| UL-94, 0.8 mm | rating | V-0 | V-0 | V-0 | V-0 |
| Tensile strength | N/mm$^2$ | 172.8 | 155.2 | 172.9 | 143.2 |
| Elongation at break | % | 2.3 | 3.3 | 2.1 | 2.7 |
| Modulus | N/mm$^2$ | 11821 | 10647 | 11408 | 10375 |
| Izod Impact | J/m | 76.1 | 75 | 99.4 | 92.5 |
| CTI | V | 300 | 400 | 300 | 400 |
| MFI (270° C./1.2 kg) | g/10 min |  | 61.4 |  | 40 |
| HDT | ° C. | 243 | 246 | 244 | 215 |
| GWIT | ° C. | 775 | 875 | 775 | 825 |
| GWFI | ° C. |  | 960 |  | 960 |

The invention claimed is:

1. An antimony trioxide free flame retardant thermoplastic composition comprising:
   (a) at least one thermoplastic polyester or polyamide in an amount of from about 40 to about 90 weight percent;
   (b) at least one brominated flame retardant in an amount of from about 5 to about 30 weight percent; and,
   (c) at least one metal phosphonate or phosphinate in an amount from about 1 to about 10 weight percent wherein the metal phosphonate or metal phosphinate is represented by the general formula:

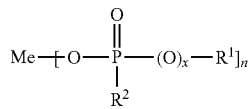

where Me is a metal, R$^1$ and R$^2$ are the same or different linear or branched or cyclic alkyls from C$_1$ to C$_6$ or benzyl, n is a metal valency and can be, 1, 2, 3 or 4, x is 1 for metal phosphonates and x is 0 for metal phosphinates.

2. The antimony trioxide free flame retardant thermoplastic composition of claim 1, wherein thermoplastic polyamide is selected from the group consisting of polyamide 6.6, polyamide 6, polyamide 11, polyamide 12, polyamide 4.6, polyamide 6.10 or polyamide 6.12 and mixtures thereof.

3. The antimony trioxide free flame retardant thermoplastic composition of claim 1, wherein brominated flame retardant is at least one compound selected from the group consisting of decabromodiphenyl oxide, tetrabromobisphenol A, tetrabromobisphenol A bis (2,3-dibromopropyl ether), tris(tribromophenoxy)triazine, tris(tribromoneopentyl) phosphate, brominated polyacrylate, brominated polystyrene, brominated epoxy polymers, end capped brominated epoxy polymers, phenoxy-terminated carbonate oligomer of tetrabromobisphenol A, decabromodiphenylethane, tetradecabromodiphenoxybenzene, ethylenebistetrabromophthalimide, tetrabromobisphenol S bis (2,3-dibromopropyl ether), poly-dibromophenylene oxide, 2-ethylhexyl tetrabromophthalate ester and bis (tribromophenoxy) ethane.

4. The antimony trioxide free flame retardant thermoplastic composition of claim 1, wherein the metal phosphonate is aluminum methyl methylphosphonate.

5. The antimony trioxide free flame retardant thermoplastic composition of claim 1, wherein the metal phosphinate is aluminum diethylphosphinate.

6. The antimony trioxide free flame retardant thermoplastic composition of claim 1 further comprising a filler.

7. The antimony trioxide free flame retardant thermoplastic composition of claim 6 wherein the filler is glass fiber.

8. The antimony trioxide free flame retardant thermoplastic composition of claim 1 further comprising an impact modifier.

9. The antimony trioxide free flame retardant thermoplastic composition of claim 1 further comprising a heat stabilizer and/or antioxidant.

10. The antimony trioxide free flame retardant thermoplastic composition of claim 1 further comprising:
    inorganic filler in an amount of from about 10 to about 35 weight percent.

11. A molded article comprising the antimony trioxide free flame retardant thermoplastic composition of claim 1.

12. The antimony trioxide free flame retardant thermoplastic composition of claim 1, wherein brominated flame retardant is at least one compound selected from the group consisting of decabromodiphenyl oxide, tetrabromobisphenol A, tris(tribromophenoxy)triazine, tris(tribromoneopentyl) phosphate, brominated polyacrylate, brominated polystyrene, phenoxy-terminated carbonate oligomer of tetrabromobisphenol A, decabromodiphenylethane, tetradecabromodiphenoxybenzene, ethylenebistetrabromophthalimide, tetrabromobisphenol S bis (2,3-dibromopropyl ether), poly-dibromophenylene oxide, 2-ethylhexyl tetrabromophthalate ester and bis (tribromophenoxy) ethane.

13. A method of making a flame retarded article comprising blending
    a. at least one thermoplastic polyester or thermoplastic polyamide in an amount of from about 40 to about 90 weight percent;
    b. at least one brominated flame retardant in an amount of from about 5 to about 30 weight percent,
    c. at least one metal phosphonate or phosphinate in an amount from about 1 to about 10 weight percent wherein the metal phosphonate or metal phosphinate is represented by the general formula:

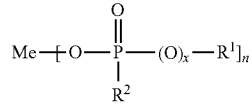

where Me is a metal, R$^1$ and R$^2$ are the same or different linear or branched or cyclic alkyls from C$_1$ to C$_6$ or benzyl, n is a metal valency and can be, 1, 2, 3 or 4, x is 1 for metal phosphonates and x is 0 for metal phosphinates, and
optionally at least one of an inorganic filler, impact modifier, antioxidant and heat stabilizer.

14. A flame retarded article made by the method of claim 13.

15. The flame retarded article of claim 14 wherein the article is an injection molded electronic component.

* * * * *